United States Patent
Dixon et al.

(10) Patent No.: US 12,469,408 B2
(45) Date of Patent: Nov. 11, 2025

(54) ULTRASOUND SCANNING SURFACE APPARATUS AND ASSEMBLY

(71) Applicant: Rivanna Medical LLC, Charlottesville, VA (US)

(72) Inventors: Adam Joseph Dixon, Charlottesville, VA (US); Frank William Mauldin, Jr., Charlottesville, VA (US)

(73) Assignee: Rivanna Medical, Inc., Charlottesville, VA (US)

( * ) Notice: Subject to any disclaimer, the term of this patent is extended or adjusted under 35 U.S.C. 154(b) by 1064 days.

(21) Appl. No.: 17/501,431

(22) Filed: Oct. 14, 2021

(65) Prior Publication Data

US 2022/0122486 A1    Apr. 21, 2022

Related U.S. Application Data

(60) Provisional application No. 63/092,713, filed on Oct. 16, 2020.

(51) Int. Cl.
  *G09B 23/30*    (2006.01)
  *A61B 8/00*    (2006.01)
  *G09B 23/28*    (2006.01)

(52) U.S. Cl.
  CPC ............ *G09B 23/286* (2013.01); *A61B 8/587* (2013.01)

(58) Field of Classification Search
  CPC ....... G09B 23/28; G09B 23/285; G09B 23/30
  See application file for complete search history.

(56) References Cited

U.S. PATENT DOCUMENTS

| | | | |
|---|---|---|---|
| 8,568,147 B2 * | 10/2013 | Kuo | G09B 23/30 434/262 |
| 8,678,831 B2 * | 3/2014 | Trotta | B29C 39/10 434/273 |
| 8,906,268 B2 * | 12/2014 | Boutet | G09B 23/286 436/15 |
| 2008/0013593 A1 * | 1/2008 | Kawabata | G09B 23/30 434/262 |
| 2010/0041005 A1 * | 2/2010 | Campbell | G09B 23/28 434/267 |
| 2013/0104678 A1 * | 5/2013 | Ni | G09B 23/30 73/866.4 |
| 2014/0294140 A1 * | 10/2014 | Kirby | A61B 6/032 378/207 |
| 2017/0122915 A1 * | 5/2017 | Vogt | A61B 8/00 |
| 2021/0049931 A1 * | 2/2021 | Jahnke | C09D 11/03 |
| 2022/0372293 A1 * | 11/2022 | Rajagopalan | C08G 77/458 |

* cited by examiner

*Primary Examiner* — Kurt Fernstrom
(74) *Attorney, Agent, or Firm* — Woods Rogers Vandeventer Black PLC; Nathan A. Evans

(57) ABSTRACT

An ultrasound training model which exhibits optically clear soft tissue-mimicking materials that are simultaneously acoustically scattering and self-healing to needle punctures. An exemplary embodiment is disclosed that comprises an embedded bone-mimicking spine model and a dual-purpose lid that may be used as a friction surface mat. Various embodiments of the training model materials are disclosed.

14 Claims, 2 Drawing Sheets

ULTRASOUND SCANNING SURFACE APPARATUS AND ASSEMBLY

CROSS-REFERENCE TO RELATED APPLICATION

The present application relies on the disclosures of and claims priority to and the benefit of the filing date of the following U.S. Provisional Patent Application:

Application No. 63/092,713 filed on Oct. 16, 2020 entitled "ULTRASOUND SCANNING SURFACE APPARATUS AND ASSEMBLY."

The disclosures of that application are hereby incorporated by reference herein in their entireties.

STATEMENT REGARDING FEDERALLY SPONSORED RESEARCH

This invention was made with government support under Grant No. R44GM123791 awarded by the National Institutes of Health (NIH) National Institute of General Medical Sciences (NIGMS). The government has certain rights in the invention.

TECHNICAL FIELD

The present invention is related to an ultrasound scanning surface apparatus that may be used for construction of ultrasound training models or for coupling an ultrasound system to the body.

BACKGROUND

Field of the Invention

Artificial medical ultrasound training models, or "phantoms," have been developed for the purposes of enhancing medical ultrasound user training or for the purposes of ultrasound equipment calibration and quality control. These training models are designed to closely or substantially mimic the acoustic properties of human tissue, namely an acoustic speed of sound around 1540 m/s and attenuation of 0.5 dB/cm/MHz. Typical materials comprising an ultrasound training model are silicone rubbers, water-based hydrogels, or polyurethane rubbers.

Description of Related Art

For the purposes of ultrasound user training, it is preferable for the training model to be optically transparent or semi-transparent so that the user may correlate the ultrasound probe positioning on the model with the acquired ultrasound image. However, in order for the ultrasound image to closely mimic human tissue, realistic acoustic scattering is required. These combined specifications for an optically transparent tissue-mimicking material (i.e. lack of optical scattering) that exhibits realistic acoustic scattering similar to muscle, fat, or organs and are not met in any currently existing ultrasound training models. The invention described herein specifies an ultrasound training model meeting these requirements and additionally exhibiting "self-healing" properties that permits insertion and withdrawal of medical needles into the training model without permanent damage.

Unlike the invention described herein, existing commercially available training models that mimic skin, muscle, ligament, and organ tissues are optically opaque, and therefore the user cannot visually inspect the interior of the training model. This limitation may reduce the effectiveness of the training model for educational and procedure competency purposes. While optically transparent training models do exist, these are also acoustically transparent, generally mimicking anechoic fluid-filled structures, and therefore do not replicate the acoustic scattering properties of human soft tissue. Similarly, self-healing training models exist commercially, but they do not comprise soft-tissue mimicking materials that are both optically transparent and with realistic acoustic backscatter, speed of sound, and attenuation. The present invention describes an apparatus that overcomes these limitations.

SUMMARY

In embodiments, the present invention overcomes limitations of existing ultrasound training models through the design of an optically transparent, but acoustic scattering, soft tissue mimicking material. The ultrasound training model invention is based on a self-healing thermoset polymer with added solid particles to promote acoustic scattering and varying levels of additives to modulate the self-healing and acoustic properties of the material. The training model, in a preferred embodiment, includes a bone-mimicking material, silicone-based surface layer, a urethane-based tissue mimicking layer, plastic housing, and silicone lid.

BRIEF DESCRIPTION OF THE DRAWINGS

The accompanying drawings illustrate certain aspects of some of the embodiments of the present invention, and should not be used to limit or define the invention. Together with the written description the drawings serve to explain certain principles of the invention. For a fuller understanding of the nature and advantages of the present technology, reference is made to the following detailed description of preferred embodiments and in connection with the accompanying drawings, in which.

DETAILED DESCRIPTION

Ultrasound training models and calibration phantoms are used in a variety of applications. For example, in medical or clinical applications, ultrasound training models are used as human-tissue alternatives for competency improvement programs. In this application, a trainee may use a training model in order to practice ultrasound scanning technique, for example, by attempting to obtain a high-quality ultrasound image or to find certain landmark anatomies within the ultrasound image. In other example use cases, a trainee may employ a training model to practice real-time image guided needle insertion techniques. In this case, the user is inserting a needle or probe into the training model while simultaneously visualizing the tissue-mimicking material and the needle or probe in the ultrasound image.

The present invention to improve upon existing ultrasound training models can be used in medical ultrasound training applications for spinal needle guidance procedures, but is not limited to this application. Those skilled in the art will appreciate that a variety of tissue structures and regions, from which training models can be developed, may benefit from the present invention. In addition, the present invention describes an apparatus construction that couples ultrasound energy into a simulated tissue region. Those skilled in the art will appreciate that this construction may be applied to other applications outside of training model constructions as there are other applications of acoustic coupling layers, e.g. ultrasound stand-off pads or medical imaging calibration devices, where the present invention may be beneficial.

Figure 1:
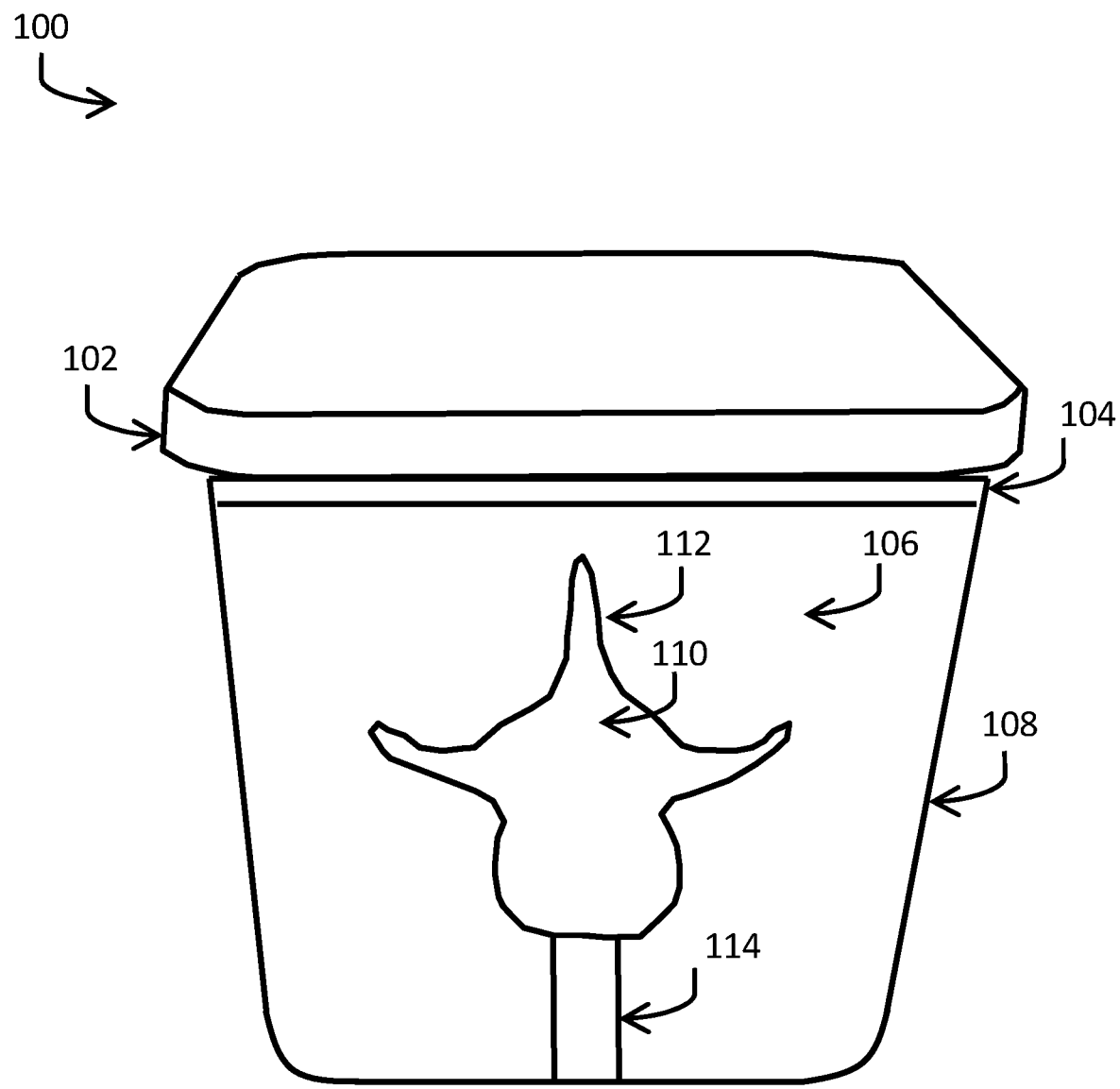
FIG. 1 depicts a side-view of an ultrasound training model.

In one exemplary embodiment, the side view of an optically transparent and acoustically realistic ultrasound lumbar spine training model 100 is depicted in FIG. 1. The training model comprises a training model lid 102 constructed from a silicone or rubber material. In aspects, the purpose of the lid is to act as a cover to the training model surface 104 and also to act as a mat, or surface, upon which to place the training model during use to prevent sliding, slipping, or skidding of the training model against a lower friction table or flat surface. Training model surface material 104, in one preferred embodiment, is comprised of a thin, optically clear, silicone material. The silicone material acts as a barrier to the tissue-mimicking material 106, can be cleaned with common hospital disinfectants, and has low surface tack. In one preferred embodiment, the silicone layer contains modifications to promote chemical adhesion to the tissue-mimicking material 106. In another preferred embodiment, the surface of the tissue-mimicking material 106 can be modified to promote covalent adhesion between the silicone surface material 104 and the tissue mimicking material surface 106. In another preferred embodiment, the surface material 104 can be constructed from a thin polymer film instead of silicone.

In an embodiment, the ultrasound lumbar spine training model 100 is contained within a clear plastic housing 108 that is open on one side, and thus provides access for the user to the training model surface 104. Those of ordinary skill in the art will recognize that the training model housing 108, in aspects, may comprise a polycarbonate, glass or other similar hard and optically transparent material with a melt temperature preferably, but not limited to, above 100 degrees Celsius. In one embodiment, the training model surface 104 and the tissue mimicking material surface 106 may comprise a colorant with desired levels of optical transparency or opacity. Suitable colorants and fillers are readily available off-the-shelf. Examples include Silc-Pig™ for silicones, UVO™ for polyurethanes and epoxies, and So-Strong™ for polyurethanes.

Tissue-mimicking material 106 can be comprised of a self-healing thermoset polymer with added solid particles to promote acoustic scattering, as well as varying levels of additives to modulate the self-healing properties of the material. The additives may comprise hydrocarbon-based plasticizers that are not covalently incorporated within the polymer matrix, but are retained within the polymer matrix by intermolecular forces, such as hydrogen bonding. Suitable plasticizers may include, but are not limited to, the following: phthalate esters, terephthalate esters, terpenes, and/or benzoate esters. The solid particles may comprise glass, silica, or polymer particles with nominal diameters between 5-300 μm. In addition, the solid particles may possess hydrophilic, hydrophobic, or fluorinated surface modifications to promote dispersion within the pre-polymer phase prior to curing of the polymer matrix. Suitable solid particles may include, but are not limited to, the following: Spheriglass A3000 (PQ Corporation, Glass Microspheres), Imsil A-10 (Sibelco, Silica Microparticles), and/or Polybeads (Polysciences Inc, Polymer Microspheres). The tissue-mimicking material 106 exhibits speed of sound, attenuation, and impedance matching or substantially matching with similar nominal values to that of human soft tissue. In a preferred embodiment, the tissue-mimicking material 106 is a two-part aliphatic polyurethane with hydrocarbon plasticizers that modulate hydrogen bonding properties within the polymer matrix to promote self-healing following puncture. Further, in this embodiment, the plasticizer is selected so that it may be incorporated at between 0-20 wt % within the tissue-mimicking material, with negligible impact on the material's acoustic properties.

In the FIG. 1 exemplary embodiment, a spinal bone mimicking material 110 is embedded inside the tissue-mimicking material 106. The bone mimicking material exhibits acoustic properties similar to those of human bone and exhibits specular reflections under medical ultrasound inspection. It may be produced from epoxy, polyurethane, or plastic. The surface of the bone mimicking material 112 that is exposed to medical ultrasound insonation possesses a surface roughness or texture, such as a high-level of surface roughness ($R_a$ greater than 20% of the acoustic wavelength), to prevent high acoustic angular sensitivity. Surface roughness can be implemented by mechanical abrasion (e.g., sandpaper), application of epoxy-based grit products, or through other known techniques such as sandblasting or applying roughened finishes to injection mold tooling. The bone mimicking material 110 can be placed at a desired location within the training model housing 108 using a stand 114. In a preferred embodiment, the stand 114 is comprised of a rigid material similar to the bone mimicking material 110, e.g. epoxy, polyurethane, or plastic.

Figure 2:
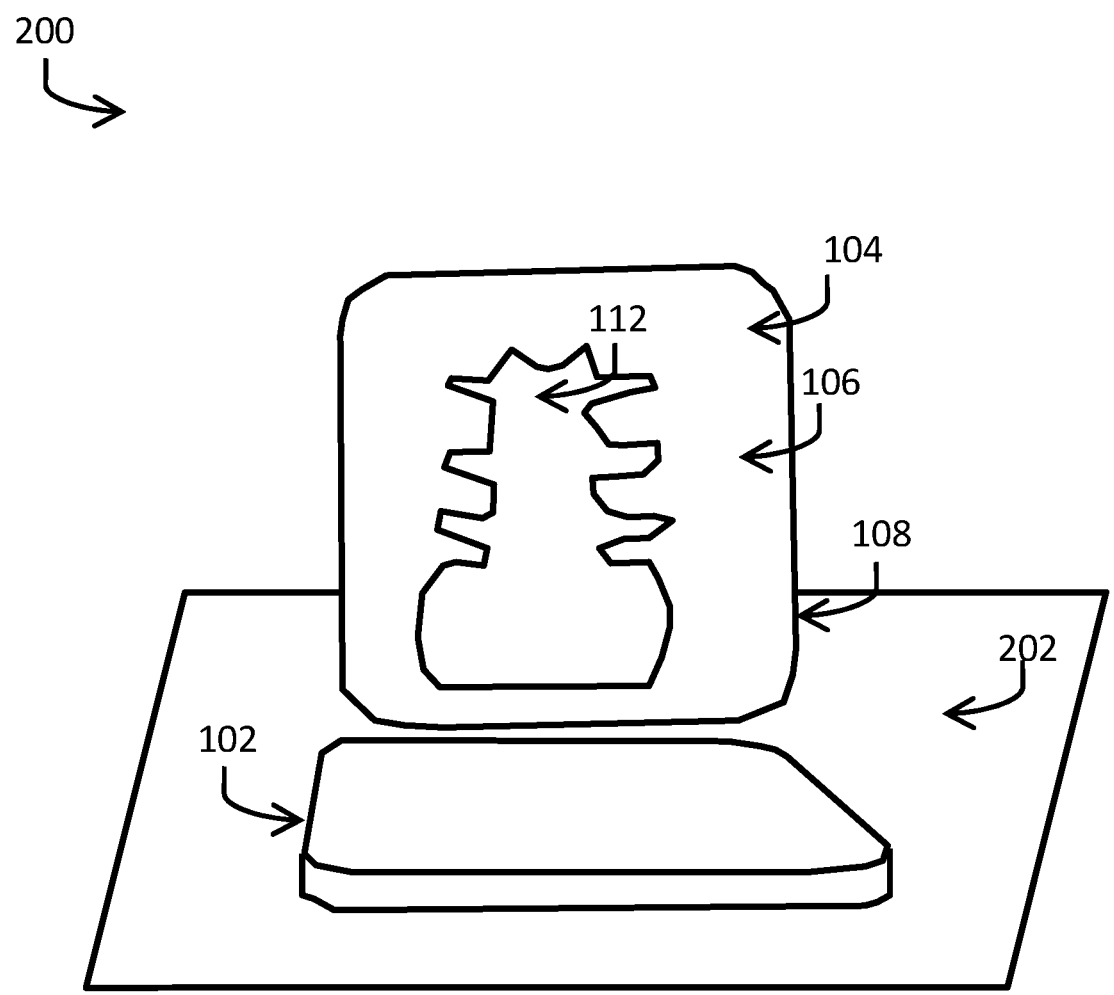
FIG. 2 depicts a top view of an ultrasound training model.

A top view of the ultrasound training model 200 is depicted in FIG. 2. In this depiction, the training model lid 102 is placed between the training model and a table surface 202 in order to prevent sliding, slipping, or skidding of the training model during use.

One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:
1. An ultrasound imaging scan model comprising:
   a housing comprising a hard or rigid and optically transparent or semi-transparent plastic or glass having a melt temperature above 100 degrees Celsius, wherein the housing further comprises at least one opening;
   a first material inside or lining the inside of all or a portion of the housing that is capable of mimicking human or animal soft tissue, wherein the first material comprises a polymer matrix, wherein the first material is optically transparent or semi-transparent, wherein the first material includes a speed of sound, an attenuation, and an acoustic impedance substantially matching that of human or animal soft tissue, wherein the first material comprises a substantially homogeneous distribution of solid particles having nominal diameters between 5 and 300 micrometers that reflect ultrasonic waves produced by an ultrasound device, and wherein the solid particles include hydrophilic, hydrophobic, and/or fluorinated surface modifications that promote dispersion within a pre-polymer phase of the first material prior to curing of the first material.

2. The ultrasound imaging scan model of claim 1, further comprising a barrier located between the first material and the at least one opening of the housing, wherein the barrier comprises a low surface tack silicone or thin polymer film, and wherein the barrier is optically transparent or semi-transparent.

3. The ultrasound imaging scan model of claim 1, wherein the first material further comprises one or more additives that modulate a self-healing property of the first material, and wherein the one or more additives comprise hydrocarbon-based plasticizers.

4. The ultrasound imaging scan model of claim 1, wherein the first material further comprises a second material capable of mimicking human or animal bone, wherein the second material comprises an epoxy, polyurethane, or plastic material having acoustic properties that specularly reflect ultrasonic waves produced by an ultrasound device.

5. The ultrasound imaging scan model of claim 4, wherein the second material is shaped to mimic a human or animal bone anatomical structure, and wherein the second material is mounted within the housing by a support structure that orients its pose in an anatomically correct position within the ultrasound imaging scan model.

6. An ultrasound imaging scan model comprising:
a housing comprising a hard or rigid and optically transparent or semi-transparent plastic or glass having a melt temperature above 100 degrees Celsius, wherein the housing further comprises at least one opening;
a first material inside or lining the inside of all or a portion of the housing that is capable of mimicking human or animal soft tissue, wherein the first material comprises a polymer matrix, wherein the first material is optically transparent or semi-transparent, wherein the first material includes a speed of sound, an attenuation, and an acoustic impedance substantially matching that of human or animal soft tissue, and wherein the first material comprises a substantially homogeneous distribution of solid particles having nominal diameters between 5 and 300 micrometers that reflect ultrasonic waves produced by an ultrasound device; and
a barrier located between the first material and the at least one opening of the housing, wherein the barrier comprises a low surface tack silicone or thin polymer film, wherein the barrier is optically transparent or semi-transparent, and wherein the first material is modified to promote covalent adhesion with the barrier.

7. The ultrasound imaging scan model of claim 6, wherein the barrier, the first material, or both, comprise an additive colorant.

8. The ultrasound imaging scan model of claim 6, wherein the first material further comprises one or more additives that modulate a self-healing property of the first material, and wherein the one or more additives comprise hydrocarbon-based plasticizers.

9. The ultrasound imaging scan model of claim 6, wherein the first material further comprises a second material capable of mimicking human or animal bone, wherein the second material comprises an epoxy, polyurethane, or plastic material having acoustic properties that specularly reflect ultrasonic waves produced by an ultrasound device.

10. The ultrasound imaging scan model of claim 9, wherein the second material is shaped to mimic a human or animal bone anatomical structure, and wherein the second material is mounted within the housing by a support structure that orients its pose in an anatomically correct position within the ultrasound imaging scan model.

11. An ultrasound imaging scan model comprising:
a housing comprising a hard or rigid and optically transparent or semi-transparent plastic or glass having a melt temperature above 100 degrees Celsius, wherein the housing further comprises at least one opening;
a first material inside or lining the inside of all or a portion of the housing that is capable of mimicking human or animal soft tissue, wherein the first material comprises a polymer matrix, wherein the first material is optically transparent or semi-transparent, wherein the first material includes a speed of sound, an attenuation, and an acoustic impedance substantially matching that of human or animal soft tissue, wherein the first material comprises a substantially homogeneous distribution of solid particles having nominal diameters between 5 and 300 micrometers that reflect ultrasonic waves produced by an ultrasound device; and
a detachable lid comprising silicone or rubber, and wherein the detachable lid is capable of acting as a place mat for the ultrasound imaging scan model to prevent sliding or slipping of the housing on a table or flat surface.

12. The ultrasound imaging scan model of claim 11, wherein the first material further comprises one or more additives that modulate a self-healing property of the first material, and wherein the one or more additives comprise hydrocarbon-based plasticizers.

13. The ultrasound imaging scan model of claim 11, wherein the first material further comprises a second material capable of mimicking human or animal bone, wherein the second material comprises an epoxy, polyurethane, or plastic material having acoustic properties that specularly reflect ultrasonic waves produced by an ultrasound device.

14. The ultrasound imaging scan model of claim 13, wherein the second material is shaped to mimic a human or animal bone anatomical structure, and wherein the second material is mounted within the housing by a support structure that orients its pose in an anatomically correct position within the ultrasound imaging scan model.

\* \* \* \* \*